2,993,010
ACTIVATION OF DEHYDRATION CATALYSTS
August Guyer and Pio Guyer, Zurich, and Paul Walther, Visp, Switzerland, assignors to Lonza Electric and Chemical Works Ltd., Basel, Switzerland
No Drawing. Filed June 28, 1957, Ser. No. 668,766
Claims priority, application Switzerland June 30, 1956
4 Claims. (Cl. 252—432)

The invention relates to the activation of phosphate catalysts, particularly of boron phosphate and similar phosphates, used in dehydration reactions, and to the catalysts thus obtained.

Phosphate catalysts are being used in various dehydration reactions, particularly in the manufacture of organic nitriles from amides, or from acids in the presence of ammonia. Generally, said phosphate catalysts, such as boron phosphate (termed more correctly: boric phosphoric oxide), cadmium phosphate, magnesium phosphate, aluminum phosphate, and the like, are prepared by reacting the metal carbonates with phosphoric acid; boron phosphate is also prepared by reacting boric acid with phosphoric acid. In said reactions, hydrated phosphate gels are obtained, which are then dehydrated at temperatures of 20–200° C. preferably at 110–120° C. and which are subsequently calcined at temperatures of 200–550° C.

We have found that the activity of said phosphate catalysts for the preparation of nitriles and dinitriles from the respective acids is considerably increased by treating the catalyst with ammonia before the catalyst is used in the nitrile synthesis.

The pretreatment with ammonia hereinafter called "conditioning," is carried out after the catalyst has been dried. In the drying operation, the wet orthophosphate gel loses that water which is not chemically bound, and it remains a dry gel which contains 1–2 mole (generally 1.5 mole) of chemically bound water. In the subsequent calcination, the chemically bound water is driven off, whereby the orthophosphates are converted to water-insoluble phosphates, which are probably meta and pyrophosphates. It is during said calcination step that the conditioning of the catalyst is carried out. We may also first carry out the calcination and then apply the conditioning treatment to the calcined catalyst: such procedure, however, requires more time, and is, for commercial production, less suitable than the combined calcination and conditioning.

The conditioning of the catalyst according to the invention produces a modification of its structure or composition. This is shown indirectly by the increased nitrile yields but may be also determined directly in various ways. Chemical analysis shows that nitrogen has been taken up. X-ray diagrams of the conditioned catalysts show lines not present in the diagrams of the unconditioned phosphate catalysts. Electron microscopic observation revails the formation of very small crystallites on the surface of the conditioned catalysts.

When the conditioned catalysts are used in the manufacture of nitriles, the yield of nitriles may be further increased by treating the catalyst during operation with small amounts of phosphoric acid. Such treatment has the effect that the activity of the catalyst is maintained constant for longer periods of time, or that at least the activity decreases more slowly. In this respect, the same results are obtained whether the phosphoric acid is introduced separately in intervals or during stoppages of the nitrile production, or whether it is added continuously to the reactants. The continuous addition may be carried out by introducing phosphoric acid separately into the vaporizer of the organic acid or by adding the phosphoric acid directly to the reactants in amounts of .5 to 8, preferably 1 to 3 percent, calculated on the total gas mixture.

The invention will be described more in detail by the following specific examples.

It will be understood that the invention is not limited to the examples and that changes may be made in the proportions of ingredients, method of procedure, reaction conditions and other details without departing from the scope of the appended claims.

EXAMPLE 1

Boric acid and phosphoric acid were mixed in amounts of .5 mole each and ground to a homogeneous paste. The mixture was dried for 3 hours at 120° C., and the dried gel was pulverized, screened and divided in two portions. Both portions were heated for 8 hours at 350° C., the one portion in air, and the other in a stream of ammonia. Then X-ray diagrams were taken from both samples by means of a Nonius camera.

In the folowing tables, an evaluation of the first lines only of the diagram is given, as these lines are sufficient to show the differences between the two samples.

In Table 1 the column 1 gives an estimation of the intensity of the rays, in columns 2–4 are given the measured values, mm. measuring in millimeters the distance on the film between the ray of the undeviated and deviated beams, $d$ being the lattice plane distance and 0 being the diffraction angle, columns 5 and 6 are the values to be found in literature.

In Table 2 the column 1 represents and estimation of the intensities of the rays, column 2 the distance between the lattice planes and columns 3–6 are the corresponding values to be found in literature.

Table 1.—*Evaluation of first lines of X-ray diagram of product calcined in air*

| Line No. | 1 Int. | 2 mm. | 4 0 | 4 $d$, A. | 5 $BPO_4$, Int. | 6 ASTM-Card,[1] $d$, A. |
|---|---|---|---|---|---|---|
| 1 | very feeble | 19.2 | 9°36' | 4.61 | | |
| 2 | feeble | 21.7 | 10°51' | 4.08 | | |
| 3 | ----do---- | 22.5 | 11°15' | 3.94 | | |
| 4 | very strong | 24.5 | 12°12' | 3.64 | 100 | 3.64 |
| 5 | very feeble | 28.4 | 14°12' | 3.13 | 8 | 3.08 |
| 6 | feeble | 36.5 | 18°15' | 2.455 | | |
| 7 | strong | 39.9 | 19°58' | 2.253 | 69 | 2.23 |
| 8 | very feeble | 46.8 | 23°24' | 1.935 | 5 | 1.97 |
| 9 | medium | 49.4 | 24°42' | 1.839 | 37 | 1.86 |

[1] Schulze, z. Phys. Ch. 24, 231 (1934).

Table 2.—*Evaluation of first lines of X-ray diagram of product calcined in ammonia*

| Line No. | 1 Int. | 2 $d$, A. | 3 $BPO_4$, Int. | 4 ASTM-Card, $d$, A. | 5 $(NH_4)H_2PO_4$, Int. | 6 ASTM-Card, $d$, A. |
|---|---|---|---|---|---|---|
| 1 | medium feeble | 5.277 | | | 83 | 5.3 |
| 2 | feeble | 3.721 | | | 53 | 3.76 |
| 3 | very strong | 3.598 | 100 | 3.64 | | |
| 4 | medium feeble | 3.045 | 8 | 3.08 | 100 | 3.07 |
| 5 | very feeble | 2.648 | | | very feeble | 2.65 |
| 6 | strong | 2.239 | 69 | 2.23 | | |
| 7 | very feeble | 1.993 | | | very feeble | 2.00 |
| 8 | feeble | 1.845 | 37 | 1.85 | | |
| 9 | very feeble | 1.802 | 12 | 1.82 | | |

The tables show that in the ammonia-calcined product additional lines appear which do not belong to boron phosphate but to $(NH_4)H_2PO_4$.

Said ammonium phosphate has grown in the form of very small crystallites (in the order of magnitude of about 2,000 to 10,000 A.), either on the surface of the boron phosphate or between the boron phosphate particles.

EXAMPLE 2

A boron phosphate gel prepared and dried as set forth in Example 1, was broken up to grains of 1–2 mm. Said grains were divided into three portions, which were calcined for 4 hours in air at 350, 380, 550° C., respectively; part of said calcined grains was then further conditioned by heating the same for 4 hours in a current of ammonia.

150 cu. cm. of each of the thus obtained 6 catalysts were placed in a reactor through which 60 g. of adipic acid and 35 g. of ammonia were passed per hour at a temperature of 320° C. under the same reaction conditions. The following yields of adiponitrile were obtained.

*Table 3*

| Calcination temperature in ° C | 350 | 380 | 550 |
|---|---|---|---|
| | Percent | Percent | Percent |
| Yield of adiponitrile unconditioned catalyst | 69 | 55 | 41 |
| Yield of adiponitrile ammonia-conditioned catalyst | 80 | 78 | 79 |

EXAMPLE 3

Boric acid and phosphoric acid were mixed in equimolar amounts, and the mixture was dehydrated at 120° C. for 4 hours. The obtained product was granulated and placed in reactors for the adiponitrile synthesis. In one reactor, 25 liters thereof were calcined for 8 hours at 375° C. in air (catalyst L), in the other reactor the same amount was calcined under the same conditions in an ammonia atmosphere (catalyst N).

Subsequently, 2.5 kg. per hour of adipic acid and 5.5 cu. m./per hour of ammonia were passed at 375° C. over said catalysts. The aqueous portion of the reaction product was extracted with methylene chloride, and the separated nitrile layer, together with the methylene chloride solution, was subjected to fractional distillation. The yields of adiponitrile were as follows:

| | Percent |
|---|---|
| Catalyst L (air calcined) | 85 |
| Catalyst N (ammonia calcined) | 90 |

EXAMPLE 4

60 parts by weight of acetic acid and 25 parts by weight of ammonia were passed at 320° C. over an air-calcined borophosphate catalyst prepared as described in the preceding example. Acetonitrile was obtained in a yield of 79 percent, calculated on the acetic acid.

If, prior to the synthesis reaction, the catalyst was conditioned for 12 hours in a current of ammonia at a temperature of 320° C., the yield of acetonitrile increased to 90 percent.

EXAMPLE 5

517 g. of cadmium carbonate were triturated with 235 g. of $H_3PO_4$ (86%) and 100 g. of $H_2O$. The milky pulp was allowed to react for 3 hours and the reaction product was then dried at 120° C. The granulated catalyst was placed in the synthesis reactor and calcined and simultaneously conditioned at 350° C.

When adipic acid and ammonia were passed over said catalyst under the conditions set forth in Example 3, adiponitrile was obtained in a yield of 86 percent. However, if the calcinateion of the cadmium phosphate catalyst had been done in air, the yield was only 78 percent.

EXAMPLE 6

Adipic acid was passed at 375° C. with an excess of ammonia over a borophosphoroxide catalyst and converted to adiponitrile in the manner set forth in Example 3.

If 2 percent by weight of 85% phosphoric acid were added to the adipic acid, a purer crude adiponitrile was obtained, and the yield of pure adionitrile rose from 90 percent to 95 percent.

EXAMPLE 7

60 g. per hour of sebacic acid and 1 g. per hour of phosphoric acid were passed at 350° C. with an excess of ammonia (50 liters per hour) over 90 g. of a borophosphoroxide catalyst, which had been conditioned in ammonia as set forth in the preceding examples. Sebaconitrile was obtained in a yield of 95 percent.

If an air-calcined borophosphoroxide catalyst was used and no phosphoric acid was added to the sebacic acid, the yield of sebaconitrile was only 80 percent.

We claim:

1. A method of activating phosphate dehydration catalysts used in the preparation of nitriles of aliphatic carboxylic acids selected from the group consisting of boron phosphate, cadmium phosphate, magnesium phosphate, and aluminum phosphate comprising drying the water containing catalysts at a temperature of about 100 to 120° C. to a chemically bound water content of 1 to 2 moles per mole of phosphate, subsequently substantially removing said chemically bound water and heating the phosphate in ammonia at temperatures of about 200–550° C., thereby producing individual ammonium phosphate crystallites on the surface of the catalyst.

2. A method of preparing a boron phosphate catalyst of increased activity in the preparation of aliphatic nitriles, said method comprising heating boron phosphate at a temperature of about 100–120° C. until it contains not more than about 1 to 2 moles of chemically bound water per mole of phosphate, and then heating said dried phosphate at a temperature of 200–550° C. for a time of about 4 to 12 hours in the presence of ammonia.

3. A dehydration catalyst suitable for the preparation of aliphatic nitriles comprising a phosphate of a metal selected from the group consisting of boron, cadmium, magnesium, and aluminum, said metal phosphate containing on its surface individual ammonium phosphate crystallites not exceeding a magnitude of about 2000 to 10,000 A.

4. A dehydration catalyst suitable for the preparation of aliphatic nitriles comprising boron phosphate containing on its surface individual ammonium phosphate crystallites not exceeding a magnitude of about 2000 to 10,000 A.

References Cited in the file of this patent

UNITED STATES PATENTS

| 2,314,894 | Potts et al. | Mar. 30, 1943 |
| 2,369,061 | Loder et al. | Feb. 6, 1945 |
| 2,525,145 | Mavity | Oct. 10, 1950 |
| 2,625,519 | Hartig | Jan. 13, 1953 |
| 2,824,843 | Dietzler | Feb. 25, 1958 |